United States Patent [19]

Belyakov et al.

[11] 4,208,360
[45] Jun. 17, 1980

[54] MASS EXCHANGE APPARATUS

[76] Inventors: Viktor P. Belyakov, prospekt Lenina, 5/1, kv. 62; Vilgelm F. Gustov, ulitsa Tereshkovoi, 5, kv. 30, both of Balashikha Moskovskoi oblasti; Khaim Y. Step, ulitsa Chelyabinskaya, 24, korpus 1, kv. 85, Moscow; Vadim A. Garin, shosse Entuziastov, 11, kv. 58, Balashikha Moskovskoi oblasti; Valentin K. Orlov, ulitsa Sovetskaya, 21, kv. 61, Balashikha Moskovskoi oblasti; Viktor S. Kortikov, ulitsa Bykovskogo, 2, kv. 63, Balashikha Moskovskoi oblasti; Nina A. Prokofieva, ulitsa Juliusa Fuchika, 2/6, kv. 8, Balashikha Moskovskoi oblasti; Anna E. Terushkina, ulitsa Tereshkovoi, 13, kv. 35, Balashikha Moskovskoi oblasti; Ljudmila B. Vinogradova, ulitsa Tereshkovoi, 13, kv. 66, Balashikha Moskovskoi oblasti, all of U.S.S.R.

[21] Appl. No.: 972,787
[22] Filed: Dec. 26, 1978
[51] Int. Cl.² .............................................. B01F 3/04
[52] U.S. Cl. .................................. 261/114 R; 202/158
[58] Field of Search ................... 261/114 R; 202/158

[56] References Cited

U.S. PATENT DOCUMENTS

| | | | |
|---|---|---|---|
| 2,495,512 | 1/1950 | Dorfan | 261/114 R |
| 2,646,977 | 7/1953 | Kraft | 261/114 R |
| 3,399,870 | 9/1968 | Zuiderweg et al. | 261/114 R |
| 3,401,090 | 9/1968 | Greenfield | 261/114 R X |
| 3,434,701 | 3/1969 | Bauer | 261/114 R |
| 3,922,326 | 11/1975 | Yoshida et al. | 261/114 R X |
| 3,937,769 | 2/1976 | Strigle, Jr. et al. | 261/114 R X |

FOREIGN PATENT DOCUMENTS

| | | | |
|---|---|---|---|
| 1035336 | 7/1966 | United Kingdom | 261/114 R |
| 1035337 | 7/1966 | United Kingdom | 261/114 R |
| 580870 | 11/1977 | U.S.S.R. | 261/114 R |

*Primary Examiner*—Richard L. Chiesa
*Attorney, Agent, or Firm*—J. Harold Nissen

[57] ABSTRACT

A mass exchange apparatus comprises a vertical cylindrical casing having pipes for admission and discharge of a liquid and a gas or a vapor. Contact plates having perforations for the passage of a gas or a vapor are arranged along the height of said vertical cylindrical casing. Each of said contact plates is provided with a central overflow device or two peripheral overflow devices, respectively, in an alternating fashion and consists of two identical segments which are secured along their chords to a central box. The axis of said central box coincides with the axis of said vertical cylindrical casing. The length of said central box substantially corresponds to the diameter of said vertical cylindrical casing. Said central box has parallel rows of apertures located above the level of said contact plates. Said central overflow devices are arranged inside said central box.

3 Claims, 2 Drawing Figures

MASS EXCHANGE APPARATUS

The invention relates to chemical engineering, and more particularly, to the construction of mass exchange apparatus.

The invention relates to the mass and heat exchange processes between a liquid and a gas or a vapour in separating mixtures comprising a plurality of components and may be used preferably in cryogenic technology for separating air into its components by the method of low-temperature rectification.

Known in the art is a mass exchange apparatus for conducting a heat and mass exchange process between a gas or a vapour and a liquid (cf. British Patent Specification No. 1,035,336, Cl. 4K, Feb. 27, 1963), comprising a vertical cylindrical casing having pipes for admission and discharge of a liquid and a gas or a vapour, perforated contact plates arranged along the height of the vertical cylindrical casing, and central and peripheral overflow devices. The central and peripheral overflow devices are secured within the apparatus by means of vertical brackets welded from the interior to the vertical cylindrical casing along the height of the latter. The contact plates are of two types alternating along the height of the mass exchange apparatus: solid plates or those consisting of two identical segments. The contact plates are secured to the central and peripheral overflow devices by bolt joints. Joints between the peripheral portions of the contact plates and the vertical cylindrical casing of the mass exchange apparatus are made tight by means of strip seals with sealing gaskets.

The known mass exchange apparatus functions in the following manner. A liquid is admitted to the top portion of the mass exchange apparatus, to the top contact plate, and a gas or a vapour (a mixture comprising several components) is fed into the bottom portion of the mass exchange apparatus. The liquid flows in the mass exchange apparatus over the contact plates by consecutively overflowing from the upper contact plates onto the contact plates located therebelow, through the central and peripheral overflow devices. A gas or a vapour ascends to the top portion of the mass exchange apparatus by passing through perforations of the contact plates and bubbling through the layer of the liquid flowing over the contact plates. The process of heat and mass exchange thereby occurs at each contact plate between the liquid and the gas or vapour so that the liquid phase is enriched in a high-boiling component, and the gaseous phase is enriched in a low-boiling component. The liquid enriched in a high-boiling component is discharged at the bottom portion of the mass exchange apparatus, the gas or vapour enriched in a low-boiling component is discharged at the top portion of the mass exchange apparatus.

The provision of two types of contact plates, the features of their fastening, and the fastening of the overflow devices within the vertical cylindrical casing, as well as the use of seals of the peripheral portions of the contact plates result in a complicated structure of the known mass exchange apparatus and high labour requirements for its assembly.

Moreover, the prior art construction cannot be used for operation at cryogenic temperatures, e.g. in air splitting plants functioning on the basis of a low-temperature rectification since temperature deformation occurring during the freezing of the mass exchange apparatus cause a reduction of strength of assemblies used to fasten the contact plates to the overflow devices, comprising bolt joints, thus resulting in a failure of the mass exchange apparatus.

It is an object of the invention to provide a mass exchange apparatus of a simpler design, which may be used in the cryogenic technology, in air splitting plants based on the low-temperature rectification process.

Another object of the invention is to improve the efficiency of heat and mass exchange process.

The invention resides in that in a mass exchange apparatus comprising a vertical cylindrical casing having pipes for admission and discharge of a liquid, and a gas or a vapour, which accommodates contact plates arranged along the height thereof and having perforations for the passage of a gas or a vapour, each plate having a central overflow device or two peripheral overflow devices, respectively, in an alternating fashion, according to the invention, each contact plate is made of two identical segments secured at the chords thereof to a central box having its axis which coincides with the axis of the vertical cylindrical casing and being of a length substantially corresponding to the diameter of the vertical cylindrical casing, the central box having parallel rows of apertures arranged above the level of the contact plates, and the central overflow devices being arranged within the central box.

This construction of the mass exchange apparatus enables a simplification of its design and reduction of labour requirements for its assembly, and the mass exchange apparatus may now be used for operation at cryogenic temperatures.

Further, the surface of each contact plate facing the flow of liquid is provided with vertical baffles extending along the flow of liquid.

This facility improves the uniformity of distribution of liquid over the surface of the contact plate and the efficiency of heat and mass exchange between a liquid and a gas or a vapour, especially in case of the mass exchange apparatus being of a large diameter.

The invention will now be described with reference to an embodiment thereof illustrated in the accompanying drawings, in which.

Figure 1:
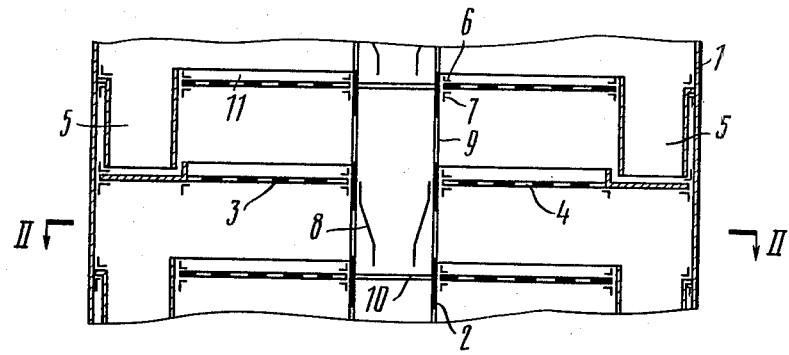
FIG. 1 is a longitudinal section of a mass exchange apparatus, according to the invention.

A mass exchange apparatus according to the invention comprises a vertical cylindrical casing 1 (FIG. 1) having pipes for admission and discharge of a liquid and a gas or a vapour (not shown in the drawings), which accommodates a coaxially arranged central box 2. Horizontal perforated plates are uniformly arranged along the height of the vertical cylindrical casing 1, each plate consisting of two identical segments 3 and 4 which are secured at their chords to the central box 2. Every second contact plate is provided with two peripheral overflow devices 5 secured to the vertical cylindrical casing 1. The segments 3 and 4 of each contact plate are secured to the vertical cylindrical casing 1 and to the central box 2 by means of an upper strip 6 and a lower strip 7, for example, of angle profile, welded to these elements, the segments 3 and 4 of the contact plate being located between the upper and lower strips.

Figure 2:
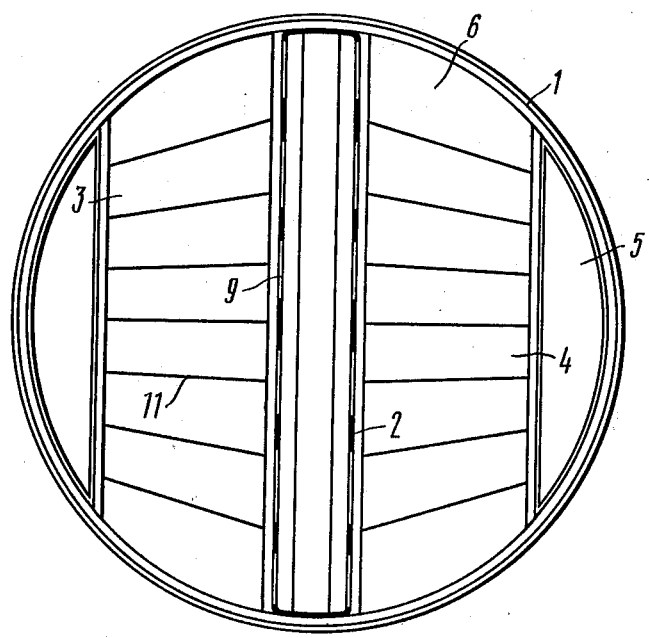
FIG. 2 is a sectional view taken along the line II—II in FIG. 1.

Central overflow devices 8 are arranged within the central box 2 which has horizontal rows of apertures 9 arranged along parallel walls thereof between the contact plates, and horizontal baffles 10 arranged at the same level with the contact plates are provided in the internal space. The sides of the contact plates facing the flow of liquid are provided with vertical baffles 11 (FIG. 2) extending along the flow of liquid. This facility improves the efficiency of heat and mass exchange (separation of components) owing to the lowering of hydraulic non-uniformity of distribution of liquid over the contact plates, especially in case of the mass exchange apparatus being of a large diameter.

During operation of the mass exchange apparatus a liquid is admitted to the top portion thereof, and a gas or a vapour (gaseous or vapour mixture comprising a plurality of components, such as air) is fed to the bottom portion of the apparatus. The liquid flows in the mass exchange apparatus over the contact plates consisting of segments 3 and 4 (FIG. 1) to overflow consecutively from upper contact plates to those located therebelow through the peripheral overflow devices 5 and central overflow devices 8. Gas or vapour ascends to the top portion of the mass exchange apparatus by passing through the perforations of the contact plates and bubbling through the layer of liquid flowing over the contact plates. The process of heat and mass exchange occurs at the contact plates between the liquid and the gas or vapour, thereby the liquid being enriched in a high-boiling component of a mixture, and the gas or vapour being enriched in a low-boiling component. The liquid enriched in a high-boiling component is discharged at the bottom portion of the mass exchange apparatus, and the gas or vapour enriched in a low-boiling component is discharged at the top portion of the apparatus.

What is claimed is:

1. An apparatus for mass exchange between downwardly flowing liquid and upwardly flowing gas or vapor, and being suitable for use at cryogenic temperatures; comprising
    (a) a vertical cylindrical casing having upper and lower end cover closures;
    (b) upper port means to provide communication through the upper end of said casing, including a liquid inlet and a vapor outlet mounted on the upper end of said casing, said liquid inlet operable to discharge liquid into the upper end of said casing and said vapor outlet operable to exhaust gaseous materials from the upper end of said casing;
    (c) lower port means to provide communication through the lower end of said casing, including a liquid outlet and a vapor inlet mounted on the lower end of said casing, said liquid outlet being operable to exhaust liquids from the bottom of said casing, said vapor inlet being operable to discharge gaseous material into the bottom of said casing;
    (d) a central conduit box mounted in said casing along the axis of said casing, said central box being substantially the same height as said casing and having a width substantially equal to the diameter of the said casing;
    (e) contact perforated plates arranged along the height of and secured to said central box, each contact plate having two identical segments secured to the central box;
    (f) said central box having horizontal rows of perforations in the walls disposed between the contact plates, to provide communication between the interior of said central box and the space between adjacent of said contact plates;
    alternate ones of said plates being the upper plate of associated pairs of plates and the plates immediately below said upper plates being the lower plate of each said pair of plates;
    (g) a peripheral overflow device communicating the space over each upper plate segement with the surface of the immediately lower segment of said lower plates;
    (h) horizontal baffles mounted in said central box at a level substantially adjacent each said upper plate to restrain fluid flow through said central box thereby to cause the flow of liquid to be redirected through said perforations and onto said upper plates;
    (i) central overflow devices mounted in said central box and providing communication between adjacent pairs of said plates and extending from said perforations over each said lower plate, passed the perforations over the next lower upper plate; and substantially to the baffle adjacent to the next lower upper plate.

2. The apparatus of claim 1, further comprising vertical baffles mounted on the upper surface of each said plate and extending in the normal direction of flow of liquid across said plate.

3. The apparatus of claim 1 or 2 wherein said central overflow device comprises horizontal baffle walls extending downwardly from said upper plates.

* * * * *